United States Patent [19]

Jenkins

[11] 4,347,155

[45] Aug. 31, 1982

[54] ENERGY EFFICIENT PERLITE EXPANSION PROCESS

[75] Inventor: Kenneth L. Jenkins, Littleton, Colo.

[73] Assignee: Manville Service Corporation, Denver, Colo.

[21] Appl. No.: 245,421

[22] Filed: Mar. 19, 1981

Related U.S. Application Data

[63] Continuation of Ser. No. 754,385, Dec. 27, 1976, abandoned.

[51] Int. Cl.³ .................. C04B 31/26; C04B 31/22; F27B 15/00
[52] U.S. Cl. ............................. 252/378 P; 432/15; 432/58
[58] Field of Search ............. 252/378 P, 378 R; 432/13, 58

[56] References Cited

U.S. PATENT DOCUMENTS

| | | | |
|---|---|---|---|
| 2,572,484 | 10/1951 | Howle et al. | 252/378 P |
| 2,639,132 | 5/1953 | Bradford | 252/378 R |
| 2,746,735 | 5/1956 | Bradford | 432/58 |
| 2,782,018 | 2/1957 | Bradford | 252/378 R |
| 3,759,660 | 9/1973 | Bon et al. | 423/13 |

Primary Examiner—P. E. Konopka
Attorney, Agent, or Firm—Robert M. Krone; Joseph J. Kelly

[57] ABSTRACT

A thermally efficient process for the expansion of perlite ore is described. The inlet port and burner of a perlite expansion chamber (preferably a vertical expander) are enclosed such that no ambient air can enter the chamber. Air and fuel are metered to the burner with the amount of air being controlled such that the fuel/air premix contains at least enough air to start and maintain minimum combustion, but not enough to provide stoichiometric combustion. At a point immediately above the burner, additional air is metered into an insulated enclosure surrounding the expansion chamber where it is preheated by the heat passing through the chamber walls. This preheated additional air is then circulated back to the burner where it provides the remainder of the air needed for combustion, normally full combustion. Flow of the burner fuel/air premix and the preheated additional air is controlled so as to maintain a long luminous flame throughout a substantial portion of the expansion chamber and also to form a moving laminar layer of air on the inner surface of the expansion chamber. Preferably the burner is a delayed mixing gas burner which materially aids in the generation of the long luminous flame. The long luminous flame and the laminar layer of air at the chamber wall eliminate hot spots in the expansion chamber, result in relatively low and uniform temperature gradients across the chamber, significantly reduce the amount of fuel consumed per unit of perlite expanded, increase the yield of expanded perlite and prevent the formation of a layer of perlite sinter on the walls of the chamber.

8 Claims, 2 Drawing Figures

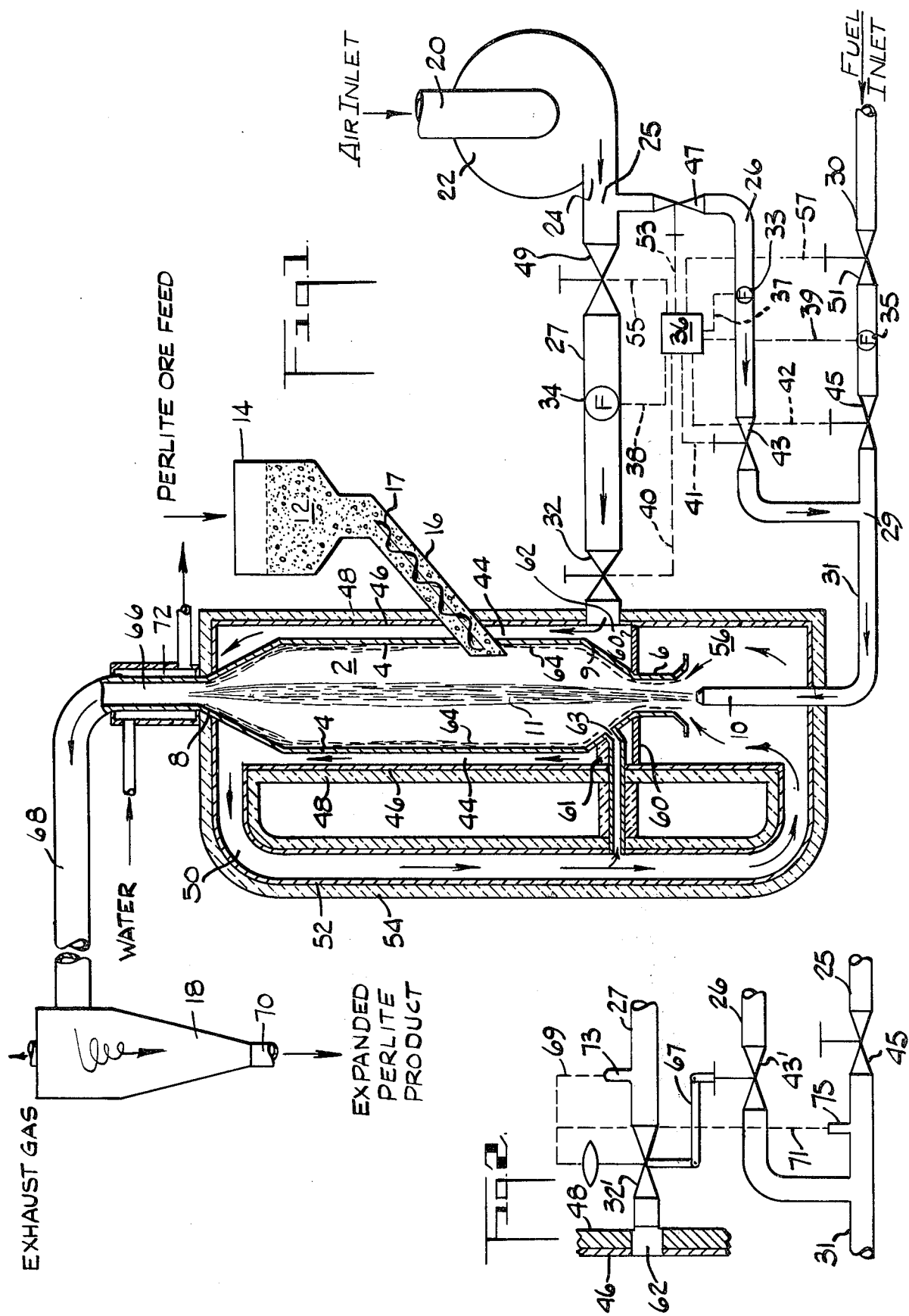

ENERGY EFFICIENT PERLITE EXPANSION PROCESS

This is a continuation of application Ser. No. 754,385, filed Dec. 27, 1976, now abandoned.

BACKGROUND OF THE INVENTION

The invention herein relates to processes for expanding perlite.

Perlite is a mineral of volcanic origin which generally falls into the rhyolitic class. The unique feature of perlite is that it contains several percent of water of hydration. If the perlite is rapidly heated to a temperature on the order of 1600° F. (870° C.) the water is converted to steam and the perlite "pops", i.e. it rapidly expands to a much lower density. The amount of expansion is usually on the order of 4 to 20 times the original volume and the final density of the expanded perlite granules will normally be in the range of about 3.5 to 5 lbs/ft$^3$ (0.06 to 0.08 g/cm$^3$) for use as insulating fillers or about 7 to 15 lbs/ft$^3$ (0.11 to 0.24 g/cm$^3$) for plaster aggregate use.

Expanded perlite is commonly formed in an expansion chamber. In conventional practice, this chamber comprises a vertical vessel, usually cylindrical, having ports at both ends. At the bottom end is a full premix burner which creates a short intense flame and a short high temperature flame zone just above the inlet port. The burner operates in the presence of large quantities of excess air, since the inlet port is open to the atmosphere. The combustion gases and excess air rise through the vertical expansion chamber and exit through the outlet port at the top. Flow rate of the combustion gases and excess air is maintained at a high rate by the use of high volume fans in the exhaust duct from the outlet port. Not only are there large quantities of excess air, but combustion takes place in the presence of continuously varying quantities of excess air, since there is no compensation for combustion air temperature variations at the exhaust fans and no means to adjust for air leaks in the exhaust lines above the furnace.

The raw perlite ore is normally injected into the vertical expansion chamber at a point somewhat above the short flame zone at the bottom of the chamber. The raw ore falls vertically through the chamber until it reaches the flame zone where it is rapidly heated and pops. The volume expansion and density reduction upon popping is sufficient such that the expanded perlite granules are thereafter buoyant enough to be entrained in the stream of combustion gases and excess air and are thereupon rapidly drawn out of the expansion chamber by the high speed exhaust gas flow. The expanded perlite granules are commonly separated from the exhaust gas flow by separation means such as cyclones.

This type of operation of perlite expanders, which has been commonplace and universal for more than 25 years, is beset with numerous problems:

(1) This process is extremely wasteful of thermal energy. Much of the heat of the flame in the flame zone goes to heat the excess air which is drawn through the inlet port. Since this air merely helps to convey the expanded perlite and does not participate in the expansion process at all, the heat imparted to it is simply wasted. (2) The wall of the combustion chamber contributes to the inefficient use of thermal energy. The wall of a perlite expansion chamber cannot be insulated with conventional insulation techniques because its inner surface then becomes hot enough to melt any expanded perlite granules which come in contact with it. This soon creates a layer of sintered perlite on the inside of the expansion chamber, particularly on the walls of that (usually conical) portion of the chamber immediately above the burner. Chunks of this sintered material frequently are dislodged from the wall and fall into the flame and extinguish it. Consequently the past practice has been to allow sufficient heat loss through the wall of the expansion chamber to keep the inner surface at a low enough temperature such that perlite sintering does not occur. This of course represents a waste of heat.

(3) The use of a conventional premix burner creates a major "hot spot" near the bottom of the expansion chamber. The rest of the expansion chamber must therefore be operated at reduced temperatures such that the hot spot can be maintained at a temperature low enough to prevent excessive sintering and melting of the perlite.

(4) The presence of the conventional premix burner hot spot at the bottom of the expansion chamber results in steep temperature gradients throughout the length of the chamber, and particularly in the regions immediately surrounding the hot spot. The resulting thermal stresses on the wall of the continuously operated vertical expansion chamber are sufficiently great that normally within two to four years of service the wall is so drastically warped out of shape that the entire expansion chamber must be replaced.

(5) The expansion characteristics of perlite ore vary widely, both because of natural mineral variations and the variations within and between particle sizes produced during crushing and grading. The conventional process for perlite ore expansion, utilizing a short flame zone and a generally uncontrolled rate of air flow through that zone, exposes ore in the chamber for short time periods at high temperatures and high thermal shock. Only certain grades of ore can be used profitably under these conditions. The rigidity of conventional expansion chamber conditions thus substantially limits the grades of ore which conventional expanders can use. Currently, only those few grades are mined, allowing chamber conditions, in effect, to limit the raw ore supply.

(6) While conventional expansion chamber conditions limit the usable grades of perlite ore, even those grades considered commercially profitable are not themselves problem-free. In some lots of ore, a substantial portion remains unexpanded. Other lots have a tendency to shatter in the conventional high intensity flame zone. Both the unexpanded and the shattered ore increase the bulk density of the collected product, and are lost to the total yield. Furthermore, in many applications of expanded perlite, unexpanded and/or shattered ore is objectionable, and excessive quantities must be removed by further separation operations.

(7) Sintering of perlite ore in conventional perlite expansion units is particularly severe when attempts are made to reduce the ore density to less than 3.5 lbs/ft$^3$ (0.06 g/cm$^3$). In order to obtain the lighter densities firing rates and feed rates must be greatly reduced such that the operation at these reduced densities is not considered economically practical.

(8) Because of the high temperature gradients in the conventional expansion chamber, a substantial portion of heat is absorbed by the chamber walls from the flame zone at the chamber bottom. Thus additional energy is needed to maintain the flame zone at the desired temperature.

(9) Waste heat exiting through the expansion chamber wall also creates high ambient temperatures in the vicinity of the expansion unit. This in turn makes it difficult for operators to work efficiently for extended periods in the vicinity of the expander. The excessive space heating can also be deleterious to instruments and other sensitive devices in the vicinity.

(10) The exhaust fans are subject to high abrasion rates from the expanded perlite. They also have widely varying efficienies because of the variations in the uncontrollable air flow rate through the system.

Heretofore attempts to alleviate these difficulties have primarily been directed to a careful selection of the optimum ore grades for expansion, adjustment of operating temperatures and/or feed rates and to a limited extent control of furnace exhaust draft. These have proved to be of only minimal effect, since they are all subject to wide variation and precise control cannot be maintained over extended periods.

In addition, efforts have been made to preheat at least a portion of the combustion air. Calculations indicating the theoretical effects of such preheating have been described in a paper presented in May, 1976, at a meeting of the Perlite Institute in Montreal, Canada. Actual efforts to preheat the combustion air and utilize such preheated air have not been particularly successful, however, because the preheated air has simply been fed to a conventional full premix burner. This has required that the hot air be drawn through a fan to increase the static pressure of the air prior to entering the burner. Since this fan handles hot expanded air, it must be of extremely large volume to compensate for the low density of the hot air and must also be constructed of materials capable of withstanding elevated temperatures of several hundred degrees. In addition, the necessary controls for such fans and premix burner feeds are complex and costly.

It would therefore be of considerable advantage to have a perlite expansion process which provides for the efficient utilization of thermal energy and high efficiency of expansion of the perlite ore.

BRIEF SUMMARY OF THE INVENTION

The invention herein relates to a perlite expansion process in which perlite ore is charged to a flame zone in an expansion chamber where it is rapidly heated and expands, and is thereafter transported out of the flame zone by entrainment in the exhaust gas stream of the flame zone, and wherein the expansion chamber has an inlet port at one end and an outlet port at the other end and the burner for creating the flame zone is disposed directly in proximity to the inlet port. The invention herein is the improvement which comprises: (a) enclosing the inlet port and burner in a first enclosure which is closed to the ambient atmosphere; (b) providing a supply of air and a supply of fuel for combustion; (c) separating the supply of air into a first air stream and a second air stream; (d) mixing the first air stream with the supply of fuel and passing the resultant fuel/air mixture to the burner; (e) controlling the relative proportions of air in the first air stream and the second air stream such that the amount of air in the first air stream is that quantity which is at least sufficient to initiate and maintain minimal combustion of the fuel, but less than the amount which is required to obtain stoichiometric combustion of the fuel; (f) passing the second air stream into a second enclosure which is adjacent to at least the bottom portion of the wall of the expansion chamber and wherein the second air stream is heated by the heat passing through the expansion chamber wall, the point at which the second air stream enters being such as to provide direct cooling to that bottom portion of the expansion chamber which is immediately adjacent to the burner; (g) passing the heated second air stream from the second enclosure into the expansion chamber in the vicinity of the burner nozzle; (h) controlling the total amount of air such that the total air supply is at least the amount necessary to obtain significant combustion of the fuel; and (i) controlling the flow rates and ratios of the fuel and air streams such that a long luminous flame is produced throughout at least half the axial dimension of the expansion chamber, a moving laminar layer of air is created along the inner surface of the expansion chamber wall, and the length of the flame path and temperature of the flame zone are suited to the characteristics of the perlite ore feed; all whereby the thermal energy consumed is efficiently utilized to expand perlite ore, improved perlite ore expansion is obtained, and equipment service life is extended. In other embodiments, the burner is a delayed mixing gas burner, the air flow of step (h) is such that substantially stoichiometric combustion of the fuel is obtained, and/or the expansion chamber is a vertical expander.

BRIEF DESCRIPTION OF THE DRAWING

FIG. 1 of the drawing illustrates schematically the process of this invention.

FIG. 2 is a fragmentary schematic view of an alternative control system for the process of this invention.

DETAILED DESCRIPTION AND PREFERRED EMBODIMENTS

The process of this invention can be best understood by reference to the drawings. Considering first FIG. 1, the central piece of apparatus of the perlite expansion unit illustrated is perlite expansion chamber 2. This is shown as a generally cylindrical vertical vessel commonly standing some 10 to 30 ft (3 to 9 m) high. While this is a commonly used configuration, and is a preferred embodiment in this invention, the invention herein is also applicable to other forms of perlite expanders. The wall 4 of expansion chamber 2 is generally made of steel or some similar material through which heat can readily pass. At the bottom of chamber 2 is inlet port 6 and at the top is outlet port 8. Situated immediately below inlet port 6 is a burner 10 which will be described in more detail later. Immediately above inlet port 6 and burner 10 is bottom portion 9 (shown here in its conventional conical shape) of expansion chamber 2. Bottom portion 9 is the most critical location for sinter formation. The raw perlite ore 12 is contained in hopper 14 from which it flows down chute 6 (which passes through wall 4 of expansion chamber 2) and is dropped into expansion chamber 2 where it falls into the flame zone 11 created by burner 10 and pops. The expanded perlite is thereafter entrained in the exhaust gases and passes out of the chamber through outlet port 8 to be separated from the exhaust gas stream as by cyclone 18.

The air and fuel supply flow rates and flow patterns are at the heart of the present invention. Air is drawn in at air inlet 20 by inlet blower 22. It will be noted that inlet blower 22 handles air at ambient conditions. This air is of course of much less volume than the heated exhaust or preheated air which would have to be handled by exhaust blowers or preheat duct fans as in prior art perlite expansion processes. Consequently inlet blower 22 can be much smaller in size than typical exhaust blowers used in conventional processes. This results in a substantial economic advantage with smaller equipment cost and also a substantially reduced energy requirement to drive the smaller blower. In addition, because of the closed nature of this process, virtually no excess air will be used so the blower equipment need not be oversized to handle such excess air.

Air flow leaving blower 22 passes through main conduit 24 to junction 25 where it is split into a first stream in line 26 and a second stream in line 27. The air in the first stream in line 26 passes on and is mixed with fuel at junction 29. The fuel supply is brought in through line 30 to junction 29 and then the fuel/air mixture is passes through lines 31 to burner 10. (As used herein, "fuel" includes all combustible materials, preferably gaseous or vaporous fuels, e.g., natural gas, propane, or atomized fuel oil.)

The second air stream in line 27 passes into preheat chamber 44, which is formed by a concentric shell around the expansion chamber 2 and spaced apart therefrom. Preheat chamber 44 has outer wall 46 which is insulated by a layer of insulation 48 to prevent heat loss out of the preheat chamber 44. The wall 4 of expansion chamber 2 forms the inner surface of preheat chamber 44, and the heat can readily pass through wall 4 into preheat chamber 44 where it serves to heat the incoming air. The insulation 48 prevents further heat loss to the exterior of the unit so that essentially all of the heat is used to preheat the incoming air and little is wasted to the surroundings. This of course serves the purpose of reducing the ambient temperature of the surroundings of the unit. In addition as will be noted below the laminar layer patterns within expansion chamber 2 substantially reduce the amount of heat actually passing through wall 4 and much of the heat is therefore utilized directly for perlite expansion. However, that portion such as radiant heat which does impinge upon wall 4 and passes through is conserved by being used to preheat the incoming air in preheat chamber 44.

The cool incoming air from line 27 will enter preheat chamber 44 at a point immediately adjacent to inlet port 6 and burner 10, as shown in FIG. 1, so that maximum cooling of bottom portion 9 of expansion chamber 2 will be obtained, thus minimizing the occurrence of perlite sintering on the walls of bottom portion 9.

The preheated air exhausts from chamber 44 through line 50 which is a conduit 52 insulated with a layer of insulation 54 so that there is little heat loss from the preheated air. Line 50 directs air into chamber 2 near burner 10 through tuyeres 63 and/or burner chamber 56 and inlet port 6. It will be noted that the entire base of the unit is enclosed by burner chamber 56. This prevents excess air from reaching inlet port 6 and allows complete control of air supply, air-to-fuel ratio, and flame combustion by use of suitable controllers on the air and fuel supply lines 26, 27, and 30. This allows complete optimizing of these parameters of operation. Preferably an annular collar 60 around the base of the perlite expansion chamber 2 prevents the preheated air from mixing with the incoming cooler air entering preheat chamber 44 at opening 62, although the flow rate of preheated air toward the inlet port 6 is usually sufficient to minimize the by-pass of cool air directly to inlet port 6. This system permits maximum preheat temperatures to be obtained while allowing annular collar 60 and expansion chamber supports such as 61 to operate at minimum temperature. It also permits maximum preheat temperature air to be used without danger of preignition of the fuel in the burner 10 or supply line 31, such as would occur if the air supply in line 31 were preheated to a temperature in excess of the air/fuel flash point prior to mixture with the fuel at junction 29.

Controls on the inlet fuel and air may be by means of flow meters and proportioning valves. In the embodiment illustrated schematically in FIG. 1, each of lines 26, 27 and 30 contains a flow meter "F" designated respectively 33, 34 and 35. Each of these flow meters senses the volume of air or fuel flowing through the line in which it is installed and generates a signal which is sent to central processing unit 36 through respectively lines 37, 38 and 39. Central processing unit 36 in turn generates signals which pass through lines 40, 41 and 42 to actuate proportioning valves 32, 43 and 45. These proportioning valves serve to control the flow of air in line 26 at that quantity necessary at least to initiate combustion of the fuel at burner 10 and to maintain at least the minimum sustainable level of combustion. All remaining air is passed through line 27 to be preheated in preheat chamber 44 rather than being diverted through line 26 to be mixed with the fuel in line 30 for burner 10. Other equivalent control systems could also be used in place of the system illustrated. Flow rate measurement devices, such as rotameters, remotely actuated valves and sensing and signal generating equipment, such as central processing unit 36, are all well known in the art and need not be described here. Some representative examples of systems and devices may be found in Perry et al; Chemical Engineers' Handbook (5th Ed., 1973), especially chapter 22.

A particularly preferred system of control is illustrated in FIG. 2. This system has the advantages of both simplicity and low cost, and is most conveniently used when the expander is to be run under relatively constant conditions for long periods. Valves 47, 49 and 51 are eliminates, as is control processor 36 and its associated signal lines. Valve 45 is set at a predetermined fixed flow rate setting for the fuel. Valve 32' is a flow proportioning valve of the type known as "air/gas ratio regulator." Valve 43' is mechanically linked to valve 32' by suitable apparatus 67 (shown only schematically) such as a four-bar link. This apparatus 67 follows the motion of valve 32' so as to simultaneously open or close valve 43' in a predetermined fixed ratio (such as 1:4) of the corresponding motion of valve 32'. The motion of valve 32' is itself determined by the relative flows of air in line 27 and fuel in line 25, as sensed by valve 32' through lines 69 and 71 to taps 73 and 75, respectively.

The flow of air and fuel to the burner is controlled, as noted, so as to initiate and maintain at least the minimum sustainable level of combustion. However, the quantity of air sent to the burner is always less than the amount needed to obtain complete (or "stoichiometric") combustion of the fuel, as determined by standard stoichiometry calculations. Normally the volumetric ratio of the burner air stream to the preheat air stream (i.e., ratio of air in line 26 to that in line 27 ) will be from 1:9 to 3:2 (i.e., 10% burner air, 90% preheat air to 60% burner air, 40% preheat air). Preferably the ratio will be in the range of 1:6 to 2:3 (i.e., 14% burner air, 86% preheat air to 40% burner air, 60% preheat air). Quite satisfactory operation has been obtained with a ratio of 1:4 (i.e., 20% burner air, 80% preheat air).

In addition to controlling the proportional flow of fuel and air through lines 26, 27 and 30, an element of this invention is also control of the total quantity of air and fuel flow such that a moving laminar layer of air 64 is created along the inner surface of wall 4. This function may also be handled by central processing unit 36 (or by a separate unit or by equivalent control systems). Unit 36 senses the signals from flow meters 33, 34 and 35, indicating the total flow through the inlet lines 26, 27 and 30. In response to these signals it generates signals to flow control valves 47, 49 and 51 through lines 53, 55 and 57. Since burner chamber 56 is totally enclosed, this completely controls the total flow of fuel and air to the burner 10 and into chamber 2 such that the laminar layer 64 is created and properly controlled. This laminar layer substantially reduces the convection flow of heat from the central axial portion of the expansion chamber to wall 4 thus substantially reducing the temperature of the wall. This in turn reduces the flow of heat through the wall and also essentially eliminates the propensity of the expanded perlite to sinter upon contact with the wall. The preheated air from line 50 enters chamber 2 (through tuyeres 63 and/or chamber 56 and inlet port 6) where it encounters the fuel/air mixture from burner 10 which at this point is undergoing only partial combustion. The preheated air and the air in the fuel/air mixture begin to mix to support or complete combustion, simultaneously creating a long luminous flame. The laminar nature of the air flow and the long luminous flame, however, delay complete mixing of all of the air for varying periods such that the long luminous flame extends throughout a substantial portion and preferably almost all of the vertical height of the expansion chamber. Simultaneously some of the air and combustion gases flow to the outer edge of the chamber 2 where they form the moving laminar layer 64. Preferably, over the course of passage through the chamber 2 virtually all of the air provided either through the burner nozzle or through the preheat chamber will be consumed and the exhaust flow through stack 66 and exhaust line 68 will comprise essentially all combustion gases and entrained perlite. The perlite is separated from the exhaust gases by cyclone 18 (or similar separation means) and collected as indicated at 70. In addition it will often be desirable to have a conveyor fan in line 68 to help keep the perlite entrained in the exhaust gas stream, particularly where line 68 comprises an extended run of conduit.

In the control system of FIG. 2, the flow rate of air and fuel necessary to create the long luminous flame and laminar layer is predetermined and the valves 45, 32' and 43' manually set initially to obtain that flow rate. Thereafter the system shown will automatically maintain the approximate conditions through normal variations of fuel, air and raw ore feed rates.

The use of a long luminous flame increases the efficiency of the perlite expansion in several aspects. (1) It creates a much longer flame zone of relatively uniform temperature without a substantial number of individual hot spots or one small local flame zone with a single hot spot as with full premix burners. (2) It substantially increases the time/temperature exposure of the perlite, thus permitting more of the perlite to reach the proper temperature for expansion. (3) A significantly larger portion of the heat output of a long luminous flame (as compared to a full premix flame) is in the form of radiation. This in turn is more readily transferred to the perlite particles than conduction or conduction heat thus resulting in greater efficiency in the heating and expansion of the perlite. (4) Conventional full premix flames which have heretofore been exclusively used for perlite expansion create only a very small flame zone at the bottom of the expander. With the long luminous flame the flame zone is considerably extended in size. (5) Because of the relatively laminar nature of the long luminous flame, there is a substantial decrease in conduction currents which transport heat away from the flame zone into the excess air. Consequently much more of the heat of the long luminous flame remains concentrated in the extended flame zone and is available for perlite expansion. (6) By spreading the heat of the flame over virtually the entire vertical height of expansion chamber 2, substantial temperature gradients in the chamber walls are significantly reduced, thus reducing stress and warpage of the expander shell. For instance, in a test of this process, a wall temperature differential over the height of a commercial expander was found to be only about 100° F. (55° C.), whereas it is common in conventional perlite expansion chambers to have temperature gradients of over 200° F. (110° C.) within only a few feet of the bottom of the chamber where the typical burner hot spot exists.

In a preferred embodiment of this invention, burner 10 is a delayed mixing gas burner. Use of such a burner significantly aids in the generation of the long luminous flame and control of the flame zone 11. The structure of such delayed mixing gas burners is well known and described, for instance, in the *North American Combustion Handbook*, pages 176-178 (1965), and therefore need not be detailed here.

The long luminous flame will have a length at least equal to one-third the corresponding dimension (e.g., height in a vertical expander) of the expansion chamber. Preferably the length will be at least one-half that dimension and more preferably the flame will extend virtually all the way through the chamber.

Close control of the perlite ore supply rate is obtained by incorporating a screw feed 17 or similar device in chute 16. This in turn improves efficiency by keeping the perlite ore feed supply to the flame zone constant at the optimum quantity of feed for the flame size and temperature used. In fact it has been found that perlite expanders operated in accordance with the process of this invention have such stable operating conditions that the rate of ore feed can be used as the only operating parameter varied by the operator to obtain optimum production.

In a preferred embodiment of this invention stack 66 may pass through heat exchanger 72 whereby a significant portion of the sensible heat contained in the exhaust gases and carrier air may be transferred to water or gas streams. The water or gas thus heated in the heat exchanger 72 may then be used for other desired purposes thus resulting in additional conservation of energy.

In an experimental trial of the process of this invention using a commercial perlite expander unit, a decrease of approximately 35% in the volume of gas required per pound of expanded perlite product was obtained. It is estimated from calculations involving the same commercial unit that a long term reduction of 40% in the amount of unexpanded and/or shattered perlite which becomes entrained in the exhaust gases and incorporated into the collected product can be obtained. Further, the same experimental work has shown that the capacity of the perlite expander can be increased by some 50% in terms of ore throughput per unit of time, and sinter accumulation is minimal.

It is also expected that the nature of this improved expansion process is such that widely varying grades of ore can be used as feed and product densities well below 3.5 lbs/ft$^3$ (0.06 g/cm$^3$) can be obtained. Service life of the equipment is also expected to be dramatically increased because of the reduction of thermal stresses.

What is claimed is:

1. In a perlite expansion process wherein perlite ore is charged to a flame zone in an expansion chamber where it is rapidly heated and expands, and is thereafter transported out of the flame zone by entrainment in the exhaust gas stream of the flame zone, and wherein said expansion chamber has an inlet port at one end and an outlet port at the other end and burner means for creating said flame zone is disposed directly in proximity to the inlet port; an improvement whereby the thermal energy consumed is efficiently utilized to expand perlite ore, sintering is minimized, improved perlite ore expansion is obtained, and equipment service life is extended, which improvement comprises:

(a) enclosing said inlet port and a delayed mixing gas burner in a first enclosure which is closed to the ambient atmosphere;

(b) providing said first enclosure with a cross-sectional area substantially greater than the cross-sectional area of said delayed mixing gas burner;

(c) providing a supply of air and a supply of fuel for combustion;

(d) separating the supply of air into a first air stream and a second air stream;

(e) mixing said first air stream with said supply of fuel and passing the resultant fuel/air mixture to said delayed mixing gas burner;

(f) controlling the relative proportions of air in said first stream and said second air stream such that the amount of air in said first air stream is that quantity which is at least sufficient to initiate and maintain minimal combustion of said fuel, but less than the amount which is required to obtain stoichiometric combustion of the fuel;

(g) passing said second air stream into a second enclosure which surrounds at least a portion of the wall of said expansion chamber and wherein said second air stream is heated by the heat passing through said wall of said chamber;

(h) passing the heated second air stream from said second enclosure through a conduit into said first enclosure;

(i) controlling the total amount of air provided such that the quantity of air is at least the amount necessary to obtain significant combustion of said fuel; and (j) controlling the flow rate and ratio of said fuel and air such that a long luminous flame having a diameter substantially less than the diameter of said expansion chamber is produced throughout at least half the axial dimension of said expansion chamber, a moving laminar layer of air is created along the inner surface of said wall of said expansion chamber, and the length of the flame path and temperature of the flame zone are suited to the characteristics of the perlite ore feed.

2. A process as in claim 1 wherein the volumetric ratio of the amount of air in said first air stream to the amount of air in said second air stream is in the range of 1:9 to 3:2.

3. A process as in claim 2 wherein said ratio is in the range of 1:6 to 2:3.

4. A process as in claim 1 wherein said air supply is provided through use of blower means on the air inlet conduit.

5. A process as in claim 1 wherein the hot exhaust gases from said expansion chamber pass through a heat exchanger external to said expansion chamber and therein transfer at least a portion of their heat to another medium.

6. A process as in claim 1 wherein said long luminous flame extends substantially throughout the entire axial dimension of said expansion chamber.

7. A process as in claim 1 wherein said expansion chamber is a vertical expansion chamber.

8. A process as in claim 1 and further comprising:

(a) passing said second air stream into said second enclosure at a location adjacent to the bottom of said expansion chamber.

* * * * *